US011299049B2

(12) United States Patent
Linehan et al.

(10) Patent No.: US 11,299,049 B2
(45) Date of Patent: Apr. 12, 2022

(54) SYSTEM AND METHOD FOR INTEGRATION OF REDUNDANT BUS ARCHITECTURE INTO A POWER SYSTEM

(71) Applicant: Faraday & Future Inc., Gardena, CA (US)

(72) Inventors: John Steven Linehan, Hawthorne, CA (US); Steven E. Schulz, Torrance, CA (US); Michael Hong, Irvine, CA (US); Anil Paryani, Cerritos, CA (US); Isaac Benjamin Meadows, Los Angeles, CA (US); Evan Roger Fischer, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/917,429

(22) Filed: Mar. 9, 2018

(65) Prior Publication Data

US 2019/0210473 A1    Jul. 11, 2019

Related U.S. Application Data

(60) Provisional application No. 62/470,133, filed on Mar. 10, 2017.

(51) Int. Cl.
*B60L 50/60* (2019.01)
*B60R 16/04* (2006.01)
*B60L 1/00* (2006.01)
*H02J 7/00* (2006.01)
*H02J 1/06* (2006.01)
*H02J 7/34* (2006.01)

(52) U.S. Cl.
CPC .............. *B60L 50/66* (2019.02); *B60L 1/00* (2013.01); *H02J 1/06* (2013.01); *H02J 7/0068* (2013.01); *H02J 7/342* (2020.01); *B60L 2210/10* (2013.01)

(58) Field of Classification Search
CPC ........ B60L 1/00; B60L 50/66; B60L 2210/10; H02J 1/06; H02J 7/0054; H02J 7/0068
See application file for complete search history.

(56) References Cited

U.S. PATENT DOCUMENTS

| | | | | |
|---|---|---|---|---|
| 2010/0148580 A1* | 6/2010 | Taniuchi | ................. | H02J 1/102 307/29 |
| 2010/0261048 A1* | 10/2010 | Kim | ...................... | H01M 10/44 429/150 |
| 2011/0254373 A1* | 10/2011 | Johnson | ................ | H02M 7/483 307/77 |

(Continued)

*Primary Examiner* — Alfonso Perez Borroto
*Assistant Examiner* — Esayas G Yeshaw

(57) ABSTRACT

The present disclosure relates to a vehicle power system. In some examples, the vehicle power system can include a plurality of redundant low-power buses coupled to respective low-power batteries. The low-power buses can be powered by a vehicle battery having a higher voltage than the voltage of the low-power batteries by way of a DCDC converter, for example. In some examples, the DCDC converter can be coupled to the low-power buses via a plurality of switches included in an Auxiliary Voltage Controller (AVC). The DCDC converter and the AVC can be housed in a common package to reduce the size, weight, and complexity of the power system while also improving the power system's durability.

8 Claims, 4 Drawing Sheets

(56) References Cited

U.S. PATENT DOCUMENTS

| | | | |
|---|---|---|---|
| 2015/0202984 A1* | 7/2015 | Wyatt | B60L 58/20 |
| | | | 320/109 |
| 2015/0340886 A1* | 11/2015 | Sung | H01M 10/441 |
| | | | 320/118 |
| 2016/0090054 A1* | 3/2016 | Powell | B60H 1/3232 |
| | | | 307/9.1 |
| 2016/0257202 A1* | 9/2016 | Chatroux | B60L 3/0046 |
| 2017/0221627 A1* | 8/2017 | Tran | H02K 99/00 |
| 2018/0029474 A1* | 2/2018 | Berels | B60L 58/21 |

\* cited by examiner

SYSTEM AND METHOD FOR INTEGRATION OF REDUNDANT BUS ARCHITECTURE INTO A POWER SYSTEM

CROSS-REFERENCE TO RELATED APPLICATIONS

This application claims the priority benefit of U.S. Provisional Application No. 62/470,133, filed Mar. 10, 2017, the entirety of which is hereby incorporated by reference.

FIELD OF THE DISCLOSURE

The present disclosure relates generally to a redundant low-voltage bus architecture and, more specifically, to a vehicle power system comprising multiple independent low-voltage buses.

BACKGROUND OF THE DISCLOSURE

Electric vehicles, including hybrid electric vehicles, can include a high voltage electric vehicle battery for powering the vehicle's motor and for powering auxiliary electronic components of the vehicle. In some examples, the auxiliary electronic components can include electronics such as a sound system, infotainment, climate control, and various electronic control units (ECUs) for controlling the vehicle's actuator systems (e.g., braking and steering). The auxiliary components can operate from a lower voltage power supply, such as a twelve-volt battery that can be recharged by the electric vehicle battery, for example. In some examples, the vehicle can include a DCDC converter configured to convert the high voltage supply from the vehicle battery to a low-voltage supply for charging the battery. Under normal operation, the DCDC converter can supply the steady-state load, whereas the battery can provide energy for load transients.

Although this architecture provides low-voltage power to the auxiliary systems of the vehicle, the single low-voltage power supply can be a point of vulnerability for the vehicle. That is to say, if the battery malfunctions or the low voltage bus is shorted during vehicle operation, the power supply to all of the auxiliary electronics can be lost. In a semi-autonomous or fully autonomous vehicle, this failure can be dangerous because one or more sensing systems or actuator systems can be required to safely operate the vehicle. Therefore, there exists a need in the field of semi- and fully autonomous vehicles for an improved auxiliary power system designed to avoid single-point failure.

SUMMARY OF THE DISCLOSURE

The present disclosure relates generally to a redundant low-voltage bus architecture and, more specifically, to a vehicle power system comprising multiple independent low-voltage buses. In some examples, a vehicle can include a high voltage vehicle battery (e.g., an electric vehicle battery of an electric vehicle). The vehicle battery can power an electric motor of the vehicle and charge one or more low-voltage batteries used to power auxiliary electronics (e.g., one or more controllers, sensors, actuators, or indicators) included in the vehicle, for example. In some examples, two or more low-voltage batteries can be provided so that some or all of the auxiliary electronics can continue to receive power uninterrupted even if one battery malfunctions, thus eliminating the possibility of a single-point failure of the whole system caused by one low-voltage battery.

In some examples, a vehicle power system can include a DCDC converter configured to convert the high voltage of the vehicle battery to a low voltage suitable for powering the auxiliary electronics and recharging the low-voltage batteries. The DCDC converter can be coupled to the low-voltage batteries by way of respective low-voltage buses and an Auxiliary Voltage Controller (AVC), for example. In some examples, the AVC can include a plurality of switches configured to isolate a failed low-voltage bus in the event of a malfunction, thus allowing the operational low-voltage bus to continue to power the auxiliary electronics of the vehicle. The AVC and the DCDC converter can be housed in a shared package that is resistant to dust, water, and high temperatures. Housing the AVC and the DCDC converter together can reduce cost, weight, and required space for the power system while improving the power system's durability and, therefore, reliability.

DETAILED DESCRIPTION

In the following description, reference is made to the accompanying drawings which form a part hereof, and in which it is shown by way of illustration specific examples that can be practiced. It is to be understood that other examples can be used and structural changes can be made without departing from the scope of the examples of the disclosure.

The present disclosure relates generally to a redundant low-voltage bus architecture and, more specifically, to a vehicle power system comprising multiple independent low-voltage buses. In some examples, a vehicle can include a high voltage vehicle battery (e.g., an electric vehicle battery of an electric vehicle). The vehicle battery can power an electric motor of the vehicle and charge one or more low-voltage batteries used to power auxiliary electronics (e.g., one or more controllers, sensors, actuators, or indicators) included in the vehicle, for example. In some examples, two or more low-voltage batteries can be provided so that some or all of the auxiliary electronics can continue to receive power uninterrupted even if one battery malfunctions, thus eliminating the possibility of a single-point failure of the whole system caused by one low-voltage battery.

In some examples, a vehicle power system can include a DCDC converter configured to convert the high voltage of the vehicle battery to a low voltage suitable for powering the auxiliary electronics and recharging the low-voltage batteries. The DCDC converter can be coupled to the low-voltage batteries by way of respective low-voltage buses and an Auxiliary Voltage Controller (AVC), for example. In some examples, the AVC can include a plurality of switches configured to isolate a failed low-voltage bus in the event of a malfunction, thus allowing the operational low-voltage bus to continue to power the auxiliary electronics of the vehicle. The AVC and the DCDC converter can be housed in a shared package that is resistant to dust, water, and high temperatures. Housing the AVC and the DCDC converter together can reduce cost, weight, and required space for the power system while improving the power system's durability and, therefore, reliability.

Figure 1:
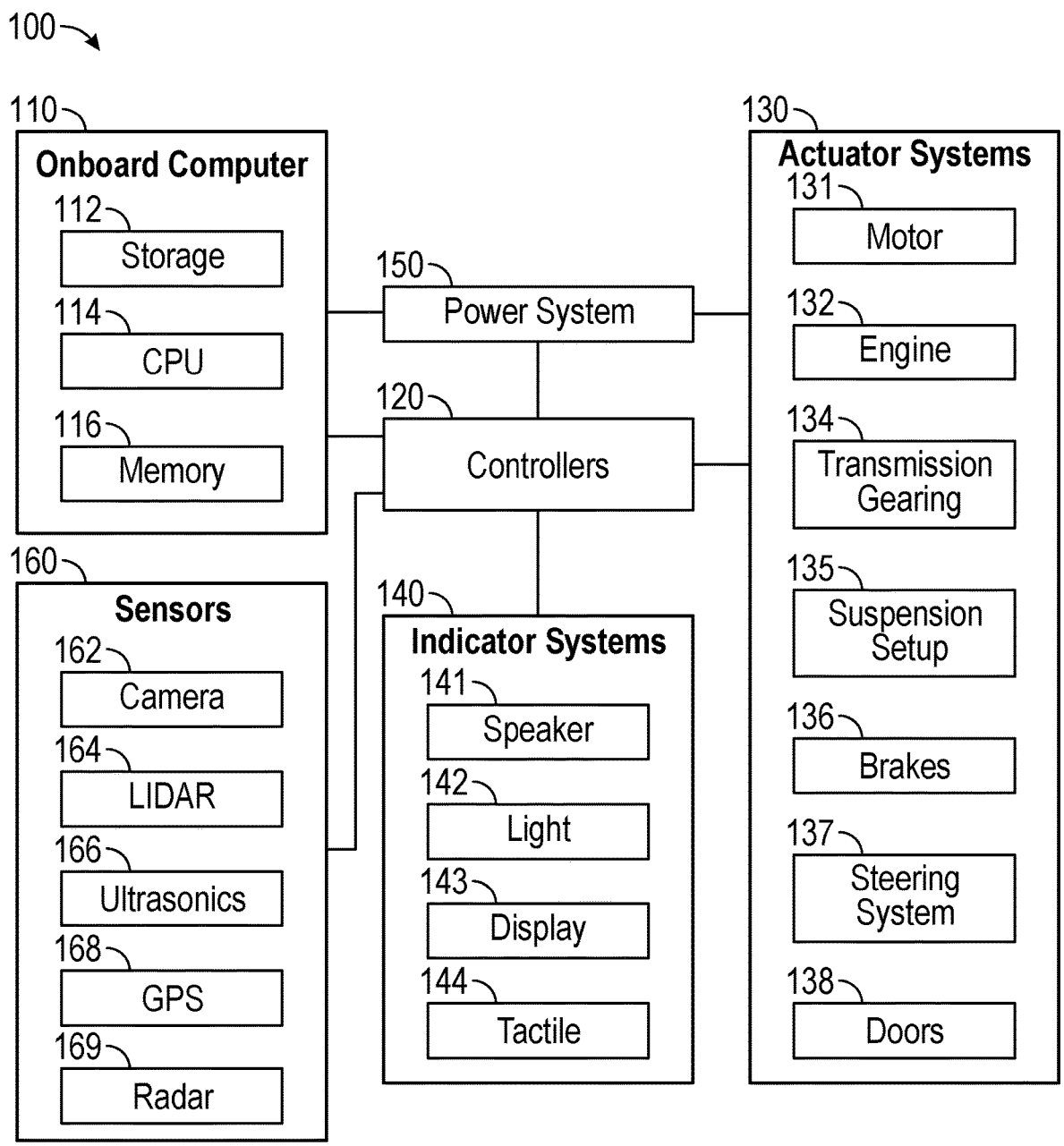
FIG. 1 illustrates an exemplary system block diagram of a vehicle control system according to examples of the disclosure.

FIG. 1 illustrates an exemplary system block diagram of a vehicle control system 100 according to examples of the disclosure. In some examples, vehicle control system 100 can include an on-board computer 110. On-board computer 110 can include storage 112, memory 116, and a processor 114. Storage 112 and/or memory 116 can be any non-transitory computer readable storage medium, such as a solid-state drive or a hard disk drive, among other possibilities. The vehicle control system 100 can also include controllers 120 capable of controlling one or more aspects of vehicle operation, including operating power system 150, actuator systems 130, indicator systems 140, or sensors 160. In some examples, one or more controllers 120 can be electronic control units (ECUs) of various vehicle components and/or subsystems.

In some examples, the vehicle control system 100 can be connected to (e.g., via controller 120) one or more actuator systems 130 in the vehicle and one or more indicator systems 140 in the vehicle. The one or more actuator systems 130 can include, but are not limited to, a motor 131 or engine 132, transmission gearing 134, suspension setup 135, brakes 136, steering system 137 and door system 138. The vehicle control system 100 can control, via controller 120, one or more of these actuator systems 130 during vehicle operation; for example, to open or close one or more of the doors of the vehicle using the door actuator system 138 or, to control the vehicle's route or driving style using the motor 131 or engine 132, transmission gearing 134, suspension setup 135, brakes 136 and/or steering system 137, etc.

The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle) and one or more tactile actuators 144 in the vehicle (e.g., as part of a steering wheel or seat in the vehicle). The vehicle control system 100 can control, via controllers 120, one or more of these indicator systems 140 to provide indications to a driver of the vehicle.

The one or more sensors 160 can include camera(s) 162, LIDAR 164, ultrasonic sensor(s) 166, GPS 168, and radar 169, for example. In some examples, other sensors are possible. The vehicle control system 100 can control, via controllers 120, the one or more sensors 160 during a semi- or fully autonomous driving mode, for example.

In some examples, the various components of vehicle control system 100 can be coupled to a power system 150. Power system 150 can provide power to the onboard computer 110, controllers 120, actuator systems 130, indicator systems 140, and sensors 160. The architecture and operation of power system 150 will now be described with reference to FIGS. 2-6.

Figure 2:
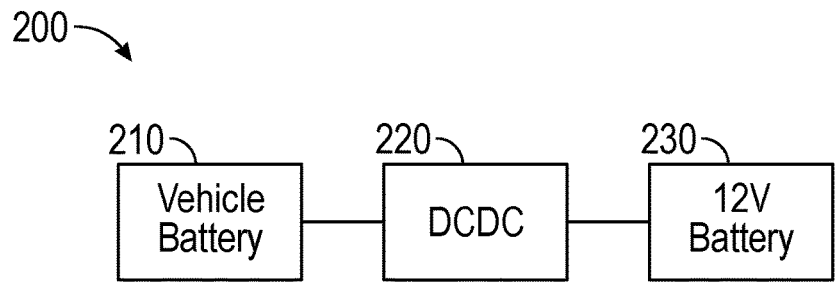
FIG. 2 illustrates an exemplary block diagram of a vehicle power system according to examples of the disclosure.

FIG. 2 illustrates an exemplary block diagram 200 of a vehicle power system 200 according to examples of the disclosure. In some examples, power system 200 can be incorporated into a vehicle as described above with reference to FIG. 1. Power system 200 can include vehicle battery 210, DCDC converter 220, and low-voltage battery 230, for example. In some examples, the vehicle can be an electric vehicle and vehicle battery 210 can be an electric vehicle (EV) battery. Vehicle battery 210 can be recharged by an external power supply (not shown) during a recharging operation, for example. In some examples, vehicle battery 210 can output a high voltage to power the motor of the vehicle. Low-voltage battery 230 can be used to power various ECUs, sensors, actuators, and indicators of the vehicle, for example. In some examples, low-voltage battery 230 can be a twelve-volt battery that can be recharged by vehicle battery 210.

While the vehicle is in operation, vehicle battery 210 can recharge low-voltage battery 230, for example. In some examples, DCDC converter 220 can convert the high-voltage output of vehicle battery 220 to a low-voltage supply matching the voltage of low-voltage battery 230. For example, if low-voltage battery 230 is a twelve-volt battery, DCDC converter can convert the high voltage output of vehicle battery 210 to twelve volts.

Although power system 200 can provide power to the motor and several auxiliary electronic systems of an electric vehicle, in some examples, the single low-voltage battery 230 can be a point of vulnerability for single-point failures. For example, if the vehicle including power system 200 is a semi- or fully autonomous vehicle, a number of ECUs, sensors, and actuators can be relied on to safely maneuver the vehicle while driving in a semi- or fully autonomous mode. If all of these components required for semi- or fully autonomous driving receive power from the same low-voltage battery 230 and the low-voltage battery 230 fails, the vehicle could be unable to operate in the semi- or fully autonomous mode with little to no advance notice, for example. Thus, in some examples, it can be desired to provide the vehicle with redundant low-voltage power supplies so that one or more of the auxiliary electronics can receive power without interruption in the event one low-voltage power supply fails.

Figure 3:
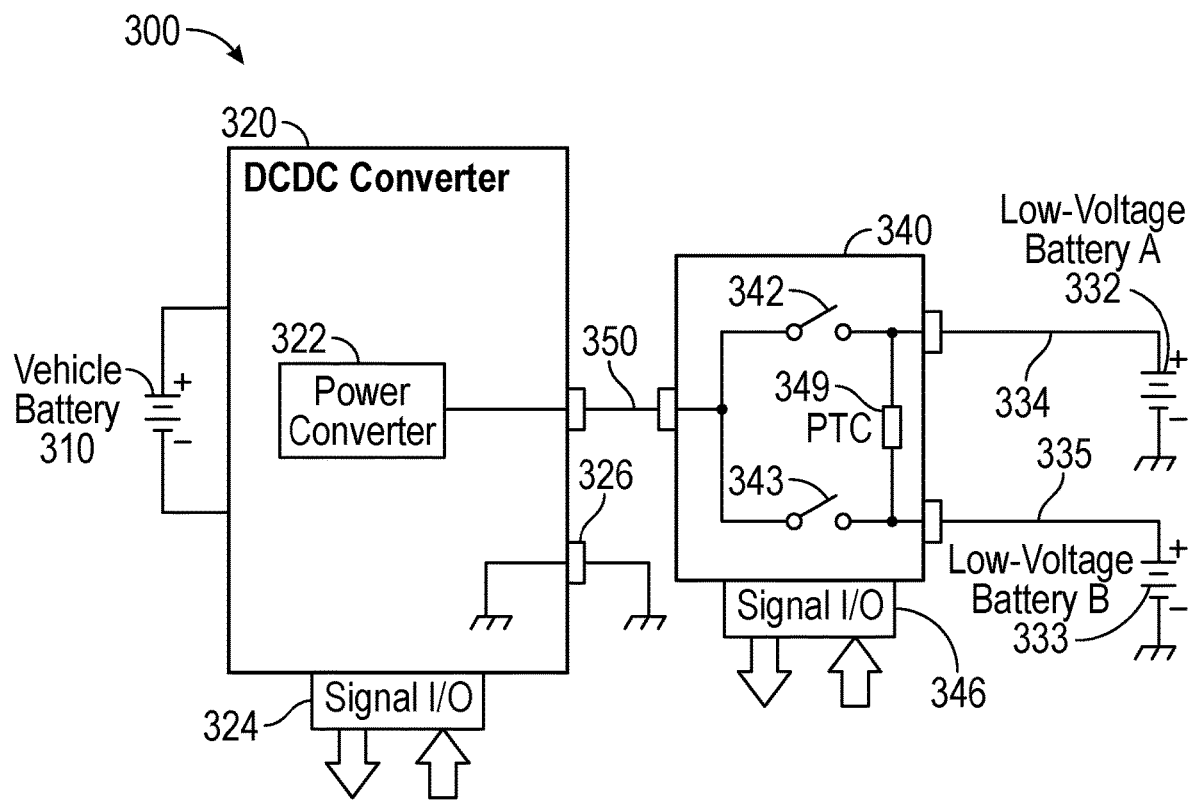
FIG. 3 illustrates an exemplary block diagram of a vehicle power system with redundant low-voltage buses according to examples of the disclosure.

FIG. 3 illustrates an exemplary block diagram of a vehicle power system 300 with redundant low-voltage buses according to examples of the disclosure. In some examples, power system 300 can be incorporated into a vehicle as described above with reference to FIG. 1. Vehicle power system 300 can include vehicle battery 310, DCDC converter 320, Auxiliary Voltage Controller (AVC) 340, a first low-voltage bus 334, a first low-voltage battery 332, a second low-voltage bus 335, and a second low-voltage battery 333. DCDC converter 320 and AVC 340 can be housed in separate packages and connected by external connection 350. In some examples, the vehicle can be an electric vehicle and vehicle battery 310 can be an EV battery. Vehicle battery 310 can be recharged by an external power supply (not shown) during a recharging operation, for example. In some examples, vehicle battery 310 can output a high voltage to power the motor of the vehicle. Low-voltage batteries 332 and 333 can be used to power various ECUs, sensors, actuators, and indicators of the vehicle, for example. In some examples, all of the auxiliary electronics can be coupled to both batteries. Alternatively, a subset of auxiliary electronics can be connected to one power supply, while another subset of electronics can be connected to both power supplies, such as the electronics needed to safely operate the vehicle in a semi- or fully autonomous driving mode, for example. In some examples, low-voltage batteries 332 and 333 can be twelve-volt batteries that can be recharged by vehicle battery 310 through DCDC converter 320 and AVC 340.

In some examples, DCDC converter 320 can include power converter 332. DCDC converter can be coupled to the vehicle battery 310 and AVC 340, for example. DCDC converter can further include GND 326 and DCDC signal I/O port 324. The DCDC signal I/O port 324 can be used to run a test sequence on startup to ensure normal operation of the DCDC converter 320, as well as provide signal level interface and communications with other controllers on the vehicle, for example.

In some examples, AVC can include switches 342 and 343 and positive thermal coefficient (PTC) device 349, for example. Switches 342 and 343 can be metal-oxide-semiconductor field-effect transistors (MOSFETs), for example. In some examples, if either low-voltage bus 334 or 335 exhibits a fault, the functioning bus can be isolated by opening the switch corresponding to the functioning bus, preventing further damage. If, for example, the switches 342 and 343 include one or more MOSFETs and one bus is shorted to ground, the body diodes of the MOSFETs can pull the output of DCDC converter 320 to ground. In this situation, an overcurrent protection device built into the DCDC converter 320 can protect and shut off the DCDC converter 320. MOSFETs can be beneficial to power system 300 because of their low RDS(on), their high current capabilities, and their fast response times, therefore exhibiting high performance and low power consumption. PTC device 349 can be a PTC resistor, for example. In some examples, PTC device 349 can allow for a low-magnitude current to flow between the first low-voltage bus 334 and the second low-voltage bus 335 when the vehicle is powered off. This connection can balance the quiescent loads on the first low-voltage battery 332 and the second low-voltage battery 333 when the vehicle is powered off, thus equalizing the voltages of the batteries 332 and 333, for example. Thus, the charge cycles of the low-voltage batteries 332 and 333 can also be balanced, which will increase the life cycle of the batteries. AVC can be coupled to the first low-voltage battery 332 by way of the first low-voltage bus 334, can be coupled to the second low-voltage battery 333 by way of the second low-voltage bus 335, and can be coupled to the DCDC converter 320 by way of external connection 350, for example. In some examples, AVC 340 can include AVC signal I/O port 346 to run a test sequence on startup to ensure proper functionality of the AVC 340.

In some examples, the low-voltage batteries 332 and 333 can be redundant batteries. That is, some or all of the auxiliary electronics (e.g., one or more controllers 120, actuators 130, indicators 140, or sensors 160) of the vehicle can be coupled to both the first low power bus 334 and the second low power bus 335 to receive power, for example. As an example, if the first low-voltage bus 334 fails, the vehicle's auxiliary electronics can continue to receive power from the second low-voltage bus 335. Likewise, if the second low-voltage bus 335 fails, the auxiliary electronics can be powered by the first low-voltage bus 334, for example. In some examples, redundant buses can ensure that a semi- or fully autonomous vehicle does not lose power to any sensors, ECUs, or actuators necessary for safe operation of the vehicle in a semi- or fully autonomous driving mode. Accordingly, in some examples, only the components needed for safe operation of the vehicle in a semi- or fully autonomous driving mode can be connected to both buses, while the other auxiliary electronics are coupled to only one bus. In some examples, those electronics that are only coupled to one bus need not be coupled all to the same bus. For example, a first subset of electronics can be coupled to both buses, a second subset of auxiliary electronics can be coupled to the first bus only, and a third subset of auxiliary electronics can be coupled to the second bus only.

While the vehicle is in operation, vehicle battery 310 can recharge low-voltage batteries 332 and 333, for example. In some examples, DCDC converter 320 can convert the high-voltage output of vehicle battery 320 to a low-voltage supply matching the voltage of the low-voltage batteries 332 and 333. For example, if low-voltage batteries 332 and 333 are twelve-volt batteries, DCDC converter 320 can convert the high voltage output of vehicle battery 310 to twelve volts. In some examples, the low-voltage output of the DCDC converter 320 can be received by AVC 340 by way of external connection 350. DCDC converter 320 and AVC 340 can be housed in separate packages and external connection 350 can be a heavy-gauge wire or cable.

Although power system 300 is capable of providing redundant low-voltage buses 334 and 335, thus improving the safety of the vehicle, incorporating the AVC 340 into power system 300 as a separate package can be expensive, can add weight to the vehicle, and requires external connection 350 which can be a point of vulnerability. To ensure reliability of the AVC 340, its package can be dust-proof and water-proof to protect its electronics from the harsh under hood environment of the vehicle. Manufacturing this package can add cost to the vehicle and the inclusion of the package can occupy space under the hood and add weight to the vehicle, for example. Further, external connection 350, which can be a heavy-gauge wire or cable, can also add cost and weight to the vehicle. The external connection 350 can be a point of vulnerability in power system 300, as it can become damaged over time, which could cause both low-voltage buses 334 and 335 to fail. Therefore, it can be desirable to include both AVC and DCDC converter in a single package to reduce the size, cost, and weight of power system 300 while also improving the power system's reliability. Including the AVC and DCDC converter in a single package can also facilitate better cooling efficiency by leveraging any existing liquid cooling systems in the DCDC or AVC. In addition not having the added contact resistance from heavy wires and connectors would improve the overall efficiency of a system where DCDC and AVC are not integrated.

Figure 4:
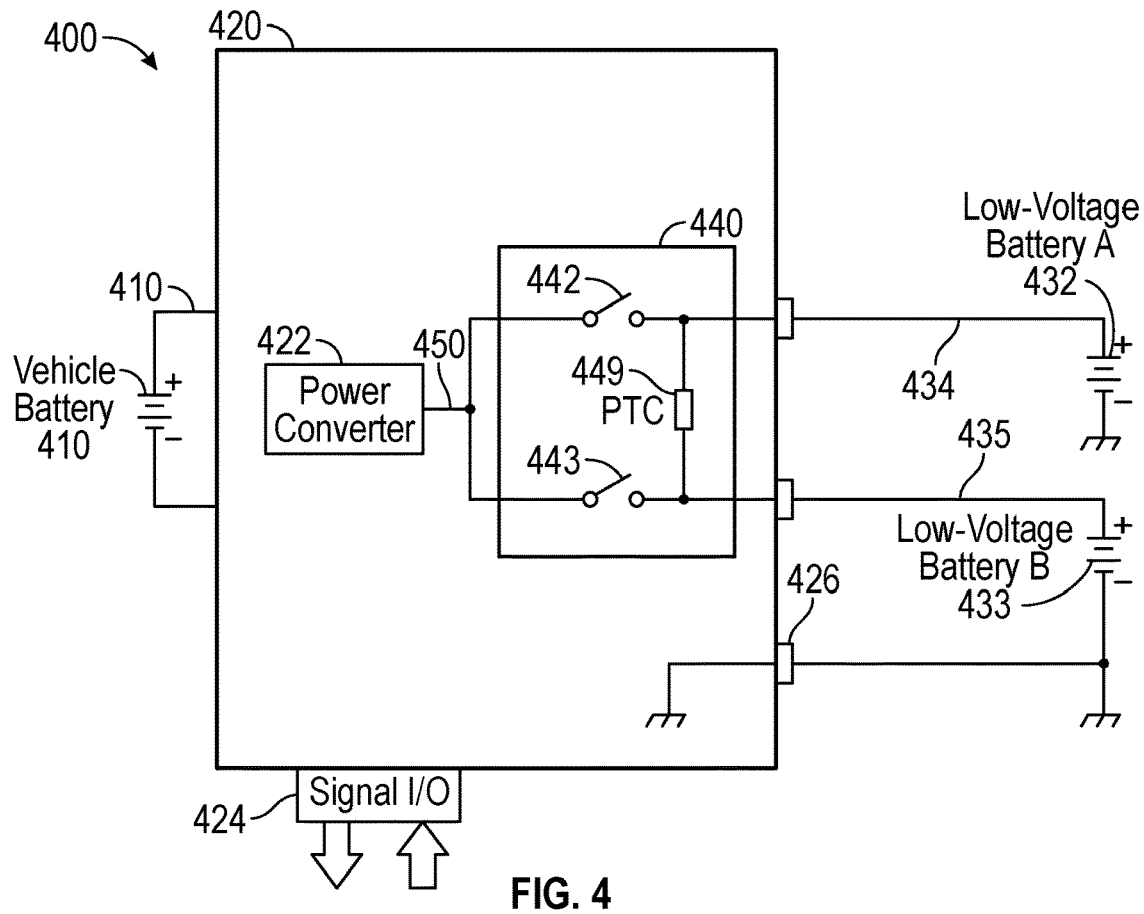
FIG. 4 illustrates an exemplary block diagram of a vehicle power system with redundant low-voltage buses according to examples of the disclosure.

FIG. 4 illustrates an exemplary block diagram of a vehicle power system 400 with redundant low-voltage buses according to examples of the disclosure. In some examples, power system 400 can be incorporated into a vehicle as described above with reference to FIG. 1. Vehicle power system 400 can include vehicle battery 410, power converter 422, Auxiliary Voltage Controller (AVC) 440, a first low-voltage bus 434, a first low-voltage battery 432, a second low-voltage bus 435, and a second low-voltage battery 433. Power converter 422 and AVC 440 can be housed in a common package 420. Hereinafter in this disclosure, the terms "package" and "module" can be used interchangeably. In some examples, the vehicle can be an electric vehicle and vehicle battery 410 can be an EV battery. Vehicle battery 410 can be recharged by an external power supply (not shown) during a recharging operation, for example. In some examples, vehicle battery 410 can output a high voltage to power the motor of the vehicle. Low-voltage batteries 432 and 433 can be used to power various ECUs, sensors, actuators, and indicators of the vehicle, for example. In some examples, one or more auxiliary electronics can be connected to both low-voltage batteries 432 and 433. A subset of auxiliary components can be connected to one battery while a subset of auxiliary electronics, such as those needed to safely operate in a semi- or fully autonomous driving mode, can be connected to both batteries, for example. In some examples, low-voltage batteries 432 and 433 can be twelve-volt batteries that can be recharged by vehicle battery 410 through DCDC converter 422 and AVC 440.

In some examples, package 420 can house power converter 422 and AVC 440. Package 420 can be coupled to vehicle battery 410, a signal I/O port 424, ground 426, a first low-voltage bus 434, and a second low-voltage bus 435, for example. In some examples, power converter 422 can convert the high voltage of vehicle battery 410 to a reduced voltage to power the low-voltage buses 434 and 435 by way of AVC 440. Signal I/O port 424 can be used to run a testing sequence on startup to determine if the power converter 422 and AVC 440 are operating as expected before starting the vehicle.

In some examples, AVC can include switches 442 and 443 and positive thermal coefficient (PTC) device 449, for example. Switches 442 and 443 can be MOSFETs, for example. In some examples, if either low-voltage bus 434 or 435 exhibits a fault, the functioning bus can be isolated by opening the switch corresponding to the functioning bus, preventing further damage. If, for example, the switches 442 and 443 include one or more MOSFETs and one bus is shorted to ground, the body diodes of the MOSFETs can pull the output of DCDC converter 422 to ground. In this situation, an overcurrent protection device built into the DCDC converter 422 can protect and shut off the DCDC converter 422. MOSFETs can be beneficial to power system 400 because of their low RDS(on), their high current capabilities, and their fast response times, therefore exhibiting high performance and low power consumption. PTC device 449 can be a PTC resistor, for example. In some examples, PTC device 449 can allow for a low-magnitude current to flow between the first low-voltage bus 434 and the second low-voltage bus 435 when the vehicle is powered off. This connection can equalize the quiescent loads on the first low-voltage battery 432 and the second low-voltage battery 433 when the vehicle is powered off, thus balancing the voltages of the batteries 432 and 433, for example. Thus, the charge cycles of the low-voltage batteries 432 and 433 can also be balanced. AVC can be coupled to the first low-voltage battery 432 by way of the first low-voltage bus 434, can be coupled to the second low-voltage battery 433 by way of the second low-voltage bus 435, and can be coupled to the power converter 422 by way of internal connection 450, for example.

In some examples, the low-voltage batteries 432 and 433 can be redundant batteries. That is, various auxiliary electronics (e.g., one or more controllers 120, actuators 130, indicators 140, or sensors 160) of the vehicle can be coupled to both the first low power bus 434 and the second low power bus 435 to receive power, for example. As an example, if the first low-voltage bus 434 fails, the vehicle's auxiliary electronics can continue to receive power from the second low-voltage bus 435. Likewise, if the second low-voltage bus 435 fails, the auxiliary electronics can be powered by the first low-voltage bus 434. In some examples, redundant buses can ensure that a semi- or fully autonomous vehicle does not lose power to any sensors, ECUs, or actuators necessary for safe operation of the vehicle in a semi- or fully autonomous driving mode. For example, the auxiliary electronics necessary for safe operation in a semi- or fully autonomous driving mode can be connected to both low-voltage buses, while other auxiliary electronics are only connected to one of the buses. In some examples, the auxiliary electronics that are connected to only one bus need not all be connected to the same bus. A first subset of electronics can be connected to both buses, a second subset of electronics can be coupled to the first bus 434, and a third subset of electronics can be coupled to only the second bus 435, for example. In some examples, however, all electronics can be coupled to both low-voltage buses.

While the vehicle is in operation, vehicle battery 410 can recharge low-voltage batteries 432 and 433, for example. In some examples, power converter 422 can convert the high-voltage output of vehicle battery 420 to a low-voltage supply matching the voltage of the low-voltage batteries 432 and 433. For example, if low-voltage batteries 432 and 433 are twelve-volt batteries, power converter 422 can convert the high voltage output of vehicle battery 410 to twelve volts. In some examples, the low-voltage output of the power converter 422 can be received by AVC 440 by way of internal connection 450. Power converter 422 and AVC 440 can be housed in one package 420 to conserve weight, space, and cost. Further, including power converter 422 and AVC 440 protects internal connection 450 between power converter 422 and AVC 440, thus improving the reliability of power system 400.

Figure 5:
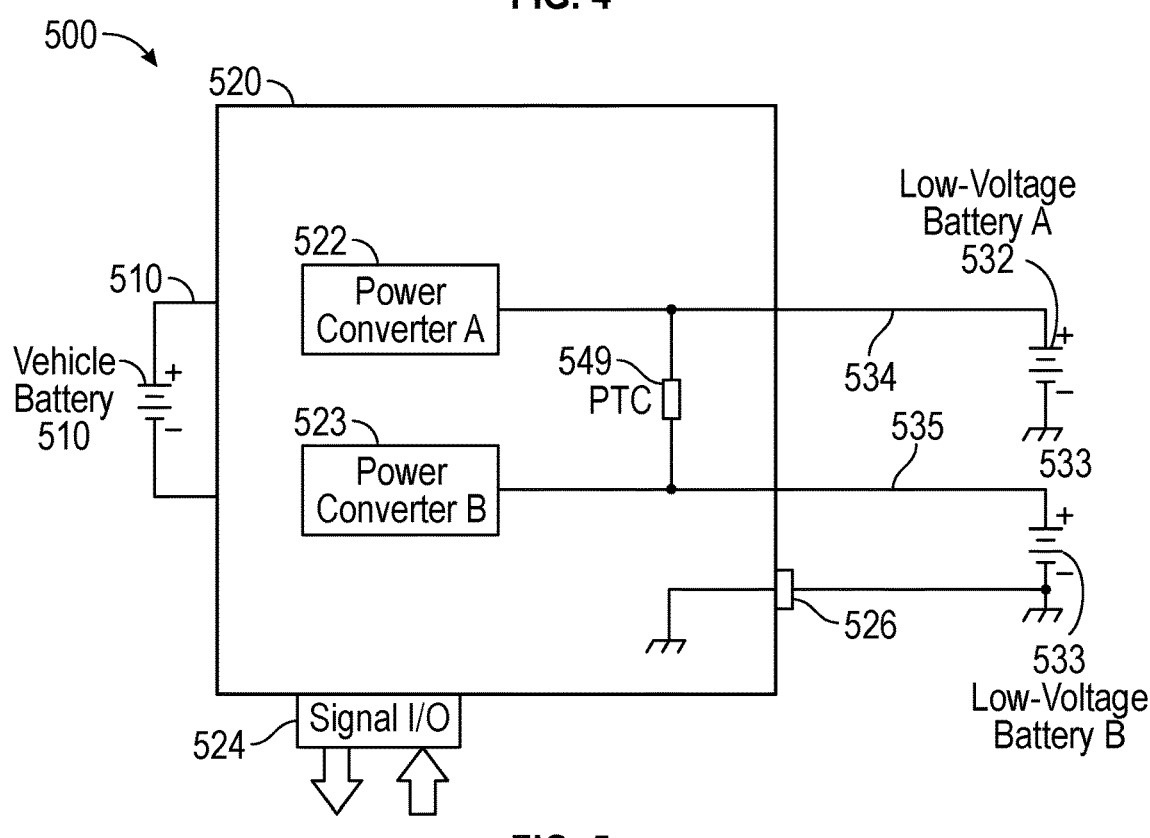
FIG. 5 illustrates an exemplary block diagram of a vehicle power system with redundant low-voltage buses according to examples of the disclosure.

FIG. 5 illustrates an exemplary block diagram of a vehicle power system 500 with redundant low-voltage buses according to examples of the disclosure. In some examples, power system 500 can be incorporated into a vehicle as described above with reference to FIG. 1. Vehicle power system 500 can include vehicle battery 510, a first power converter 522, a second power converter 523, a first low-voltage bus 534, a first low-voltage battery 532, a second low-voltage bus 535, and a second low-voltage battery 533. The first power converter 522 and the second power converter 523 can be housed in a common package 520. In some examples, the vehicle can be an electric vehicle and vehicle battery 510 can be an EV battery. Vehicle battery 510 can be recharged by an external power supply (not shown) during a recharging operation, for example. In some examples, vehicle battery 510 can output a high voltage to power the motor of the vehicle. Low-voltage batteries 532 and 533 can be used to power various ECUs, sensors, actuators, and indicators of the vehicle, for example. In some examples, all auxiliary electronics of the vehicle can be coupled to both low-voltage buses 534 and 535. Alternatively, in some examples, some auxiliary electronics of the vehicle can be connected to one bus, while other electronics, such as those needed to safely operate in a semi- or fully autonomous driving mode, can be coupled to both low-voltage buses 534 and 535. Low-voltage batteries 532 and 533 can be twelve-volt batteries that can be recharged by vehicle battery 510 through power converters 522 and 523, respectively, for example.

In some examples, the first power converter 522 and the second power converter 523 can be housed in one package 520 to conserve weight, space, and cost, compared to housing them separately. Package 520 can house the first power converter 522 and the second power converter 523. Package 520 can be coupled to vehicle battery 510, a signal I/O port 524, ground 526, a first low-voltage bus 534, and a second low-voltage bus 535, for example. The first power converter 522 can be coupled to the first low-voltage battery 532 by way of the first low-voltage bus 534. Likewise, the second power converter 523 can be coupled to the second low-voltage battery 533 by way of the second low-voltage bus 535. In some examples, the first power converter 522 can convert the high voltage of vehicle battery 510 to a reduced voltage to power the first low-voltage bus 534. Likewise, in some examples, the second power converter 523 can convert the high voltage of vehicle battery 510 to a reduced voltage to power the second low-voltage bus 535. In this way, vehicle battery 510 can recharge low-voltage batteries 532 and 533 while the vehicle is in operation, for example. Signal I/O port 524 can be used to run a testing sequence on startup to determine if the power converters 522 and 523 are operating as expected before starting the vehicle. PTC device 549 can be a PTC resistor, for example. In some examples, PTC device 549 can allow for a low-magnitude current to flow between the first low-voltage bus 534 and the second low-voltage bus 535 when the vehicle is powered off. This connection can equalize the quiescent loads on the first low-voltage battery 532 and the second low-voltage battery 533 when the vehicle is powered off, thus balancing the voltages of the batteries 532 and 533, for example. Thus, the charge cycles of the low-voltage batteries 532 and 533 can also be balanced.

In some examples, the low-voltage batteries 532 and 533 can be redundant batteries. That is, various auxiliary electronics (e.g., one or more controllers 120, actuators 130, indicators 140, or sensors 160) of the vehicle can be coupled to both the first low power bus 534 and the second low power bus 535 to receive power, for example. As an example, if the first low-voltage bus 534 fails, the vehicle's auxiliary electronics can continue to receive power from the second low-voltage bus 535. Likewise, if the second low-voltage bus 535 fails, the auxiliary electronics can be powered by the first low-voltage bus 534, for example. In some examples, redundant buses can ensure that a semi- or fully autonomous vehicle does not lose power to any sensors, ECUs, or actuators necessary for safe operation of the vehicle in a semi- or fully autonomous driving mode. For example, only those auxiliary electronics necessary for safe operation of the vehicle in a semi- or fully autonomous driving mode can be coupled to both buses, while other auxiliary electronics are coupled to one bus. The auxiliary electronics only coupled to one bus need not all be coupled to the same bus. For example, a first subset of auxiliary electronics can be coupled to both buses, a second subset of auxiliary electronics can be coupled to the first low-voltage bus 534, and a third subset of auxiliary electronics can be coupled to the second low-voltage bus 535. Alternatively, in some examples, all auxiliary electronics can be coupled to both buses 534 and 535.

Figure 6:
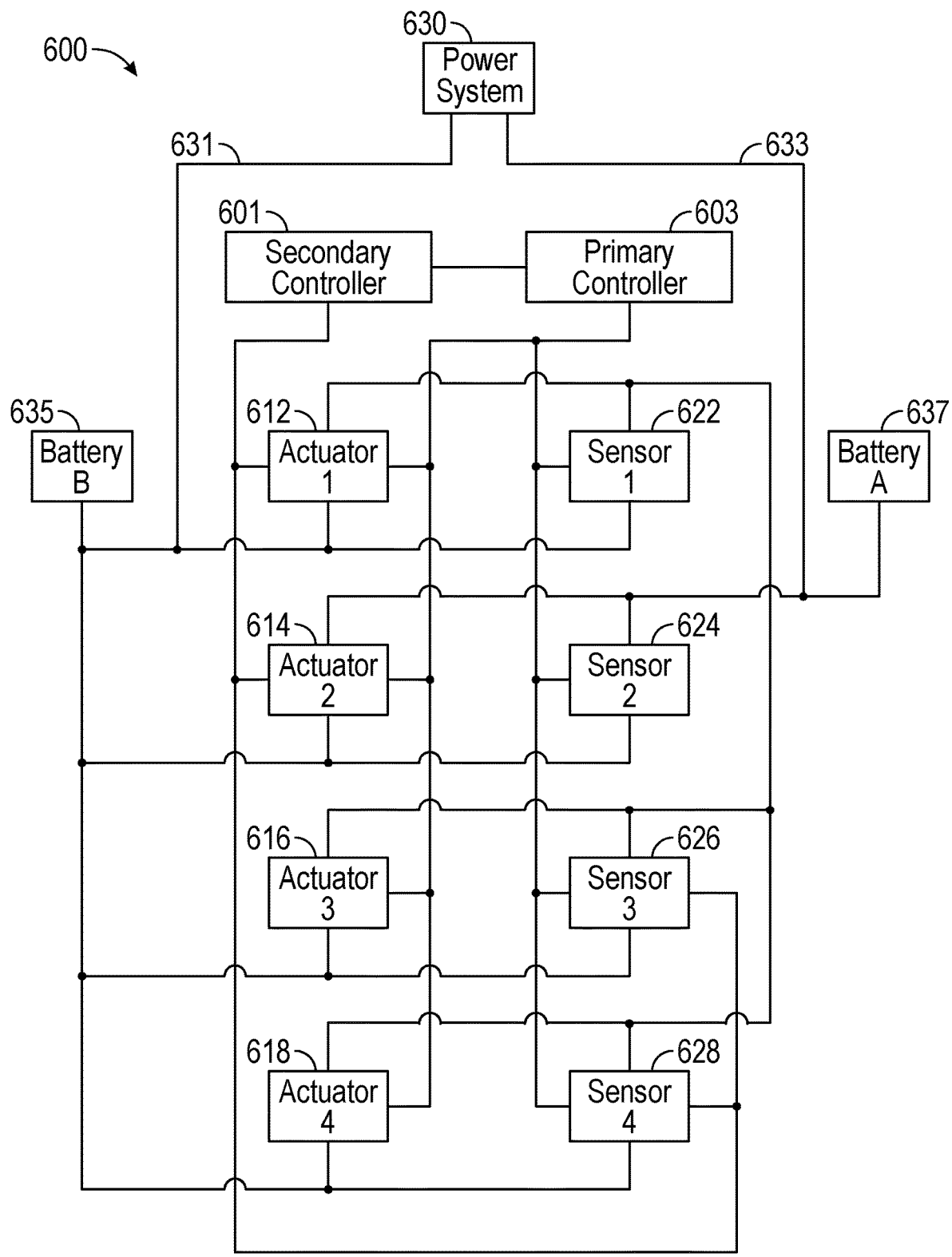
FIG. 6 illustrates a system block diagram of an exemplary vehicle 600 with redundant low-voltage buses and redundant controllers according to examples of the disclosure.

FIG. 6 illustrates a system block diagram of an exemplary vehicle 600 with redundant low-voltage buses and redundant controllers according to examples of the disclosure. In some examples, vehicle 600 can include a primary controller 603, a secondary controller 601, a plurality of actuators 612-618, a plurality of sensors 622-628, a power system 630, two low-voltage buses 631 and 633, and two low-voltage batteries 635 and 637. Primary controller 603 and secondary controller 601 can be controllers 120, as described with reference to FIG. 1, for example. Power system 630 can be a power system 150, 200, 300, 400, or 500 as above described with reference to FIGS. 1-5.

In some examples, primary controller 603 can be operatively coupled to sensors 622-628 and actuators 612-618 to control their operation. Sensors 6221-628 can by any sensors 160 described above with reference to FIG. 1, for example. In some examples, other sensors are possible. Actuators 612-618 can be any actuators 130 described above with reference to FIG. 1. In some examples, other actuators are possible. Sensors 622-628 and actuators 612-618 can be used during a semi- or fully autonomous driving mode, for example. During normal vehicle operation, primary controller 603 can control the semi- or fully autonomous driving mode using the sensors 622-628 and actuators 612-618. However, in case primary controller 603 malfunctions, secondary controller 601 can be operatively coupled to actuators 612 and 614 and sensors 626 and 628. Further, in some examples, secondary controller 601 can be operatively coupled to primary controller 603 to continuously receive safe stop strategy data. In some examples, the safe stop strategy data can include maps of nearby obstacles, sensor data, or other information. Based on the safe stop strategy data and the outputs of sensors 626 and 628, secondary controller 601 can use actuators 612 and 614 to maneuver the vehicle to a safe location to stop in the semi- or fully autonomous driving mode. In some examples, secondary controller 601 may not be coupled to all of the sensors (e.g., sensors 622 and 624) and/or all of the actuators (e.g., actuators 616 and 618), thus limiting its use to controlling a subset of vehicle sensors and actuators to perform an emergency stop.

Providing a secondary controller 601 with functionality limited to performing an emergency stop can ensure safe operation of the vehicle in a semi- or fully autonomous driving mode, even if the primary controller 603 malfunctions. Further, providing only this limited functionality can reduce the cost and complexity of secondary controller 601, and therefore the vehicle, compared to the cost and complexity of providing two fully operational controllers.

In addition to including redundant controllers to prevent a single-point failure caused by a malfunction of either controller, vehicle 600 can further include redundant batteries to prevent a single-point failure caused by a malfunction of either battery. In some examples, a first low-voltage battery 637 and a second low-voltage battery 635 can provide power to all actuators 612-618 and all sensors 622-628. The first low-voltage battery 637 can be coupled to power system 630 by a first low-voltage bus 633, for example. Likewise, for example, the second low-voltage battery 635 can be coupled to power system 630 by a second low-voltage bus 631. Although FIG. 6 illustrates all actuators 612-618 and all sensors 622-628 as being coupled to both the first low-voltage bus 633 and the second low-voltage bus 631, in some examples, a subset of actuators and/or sensors can be coupled to both buses 633 and 631. The components connected to only one bus need not all be connected to the same bus, either. In some examples, the low-voltage batteries 635 and 637 can be recharged by power system 630 as described above with reference to FIGS. 1-5.

Therefore, according to the above, some examples of the disclosure are related to a module comprising: a housing enclosing: a controller comprising a plurality of switches; a DCDC converter operatively coupled to the first battery, and operatively coupled to the second battery and the third battery via the plurality of switches of the controller, the DCDC converter configured to: receive as an input a first voltage from the first battery; and output a second voltage to the controller, wherein: the first battery, the second battery, and the third battery are all external to the housing. Additionally or alternatively, in some examples, the second battery and the third battery are rechargeable. Additionally or alternatively, in some examples, the controller is a first controller, and the power system further comprises: a second controller operatively coupled to an input/output port, the DCDC converter, and the first controller, the second controller configured to: receive a testing protocol from the input/output port; and execute the testing protocol on the DCDC converter and the second controller. Additionally or alternatively, in some examples, the module further comprises a positive thermal coefficient device configured to operatively couple the second battery and the third battery so that a current can flow between the second battery and the third battery when the first battery is disconnected from the second battery and the third battery. Additionally or alternatively, in some examples, the plurality of switches each comprise a metal-oxide-semiconductor field-effect transistor (MOSFET). Additionally or alternatively, in some examples, the plurality of switches each comprise a plurality of MOSFETs coupled in parallel. Additionally or alternatively, in some examples, the second battery and the third battery are operatively coupled to a plurality of electronic components so that each electronic component can receive power from one or more of the second battery and the third battery. Additionally or alternatively, in some examples, the second battery and the third battery have the second voltage.

Some examples of the disclosure are directed to a vehicle comprising: one or more electronic components; an electric motor; and a power system comprising: a first battery having a first voltage; a second battery having a second voltage less than the first voltage; a third battery having the second voltage a controller comprising a plurality of switches; and a DCDC converter operatively coupled to the first battery, and operatively coupled to the second battery and the third battery via the plurality of switches of the controller, the DCDC converter configured to: receive as an input the first voltage from the first battery; and output the second voltage to the controller, wherein the DCDC converter and the controller are housed in a shared package, the one or more electronic components are powered by one or more of the second battery and the third battery, and the electric motor is powered by the first battery.

Some examples of the disclosure are related to method of powering a vehicle, the method comprising: powering an electric motor with a first battery having a first voltage; powering one or more electronic components included in the vehicle with one or more of a second battery and a third battery, the second battery and the third battery having a second voltage less than the first voltage; coupling a DCDC converter to the first battery; converting, with the DCDC converter, the first voltage to the second voltage; coupling, via a plurality of switches included in a controller, the second battery and the third battery to the output of the DCDC converter, wherein the DCDC converter and the controller are housed within a shared package.

Some examples of the disclosure are related to a power system, comprising: a first battery having a first voltage; a second battery having a second voltage less than the first voltage; a third battery having the second voltage; a controller comprising a plurality of switches; and a DCDC converter operatively coupled to the first battery, and operatively coupled to the second battery and the third battery via the plurality of switches of the controller, the DCDC converter configured to: receive as an input the first voltage from the first battery; and output the second voltage to the controller, wherein the DCDC converter and the controller are housed within a shared package.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A module comprising:
a housing enclosing:
a first controller comprising a plurality of switches;
a DCDC converter operatively coupled to a first battery, and operatively coupled to a second battery and operatively coupled to a third battery via the plurality of switches of the first controller, the DCDC converter configured to:
receive as an input a first voltage from the first battery; and
output a second voltage to the controller, wherein: the first battery, the second battery, and the third battery are all external to the housing; and
a second controller operatively coupled to an input/output port, the DCDC converter, and the first controller, the second controller configured to:
receive a testing protocol from the input/output port; and
execute the testing protocol on the DCDC converter and the second controller.

2. The module of claim 1, wherein the second battery and the third battery are rechargeable.

3. The module of claim 1, further comprising:
a positive thermal coefficient device configured to operatively couple the second battery and the third battery so that a current can flow between the second battery and the third battery when the first battery is disconnected from the second battery and the third battery.

4. The module of claim 1, wherein the plurality of switches each comprise a metal-oxide-semiconductor field-effect transistor (MOSFET).

5. The module of claim 1, wherein the plurality of switches each comprise a plurality of MOSFETs coupled in parallel.

6. The module of claim 1, wherein the second battery and the third battery are operatively coupled to a plurality of electronic components so that each electronic component can receive power from one or more of the second battery and the third battery.

7. The module of claim 1, wherein the second battery and the third battery have the second voltage.

8. A vehicle comprising:
one or more electronic components;
an electric motor; and
a power system comprising:
a first battery having a first voltage;
a second battery having a second voltage less than the first voltage;
a third battery having the second voltage
a first controller comprising a plurality of switches; and
a DCDC converter operatively coupled to the first battery, and operatively coupled to the second battery and the third battery via the plurality of switches of the controller, the DCDC converter configured to:
receive as an input the first voltage from the first battery; and
output the second voltage to the controller; and
a second controller operatively coupled to an input/output port, the DCDC converter, and the first controller, the second controller configured to:
receive a testing protocol from the input/output port; and execute the testing protocol on the DCDC converter and the second controller; wherein:

the DCDC converter, the first controller, and the second controller are housed in a shared package, the one or more electronic components are powered by one or more of the second battery and the third battery, and the electric motor is powered by the first battery.

* * * * *